United States Patent

Izawa et al.

[11] Patent Number: 5,287,044
[45] Date of Patent: Feb. 15, 1994

[54] DRIVE CIRCUIT FOR BRUSHLESS MOTOR

[75] Inventors: Hirokazu Izawa, Aichi; Kenichi Komiya, Kawasaki, both of Japan

[73] Assignee: Kabushiki Kaisha Toshiba, Kawasaki, Japan

[21] Appl. No.: 968,387

[22] Filed: Oct. 29, 1992

[30] Foreign Application Priority Data

Oct. 31, 1991 [JP] Japan .................. 3-286005

[51] Int. Cl.$^5$ .............. H02P 7/14; H02P 6/02
[52] U.S. Cl. .............................. 318/254
[58] Field of Search ............. 318/138, 254, 439

[56] References Cited

U.S. PATENT DOCUMENTS 3,611,081 10/1971 Watson .................. 318/254 X
3,916,272 10/1975 Grunleitner et al. ........ 318/138
4,359,674 11/1982 Gotou .................... 318/138
4,472,666 9/1984 Akeda et al. ............. 318/254

Primary Examiner—Bentsu Ro
Attorney, Agent, or Firm—Limbach & Limbach

[57] ABSTRACT

A drive circuit for a brushless motor includes position detectors for detecting a rotational position of a rotor of the brushless motor, thereby generating position detection signals. A plurality of amplifiers have respective transistors at least in its output stage and feed an electric power to stator windings of the brushless motor through the transistors of the output stage in a timing in accordance with the position detection signals from the position detectors respectively. Each amplifier has an amplification degree varied based on a speed control signal. A voltage detector detects an output voltage of each amplifier. A power supply adjusting device controls a power supply voltage applied to each amplifier based on a detection voltage of the voltage detector.

2 Claims, 5 Drawing Sheets

DRIVE CIRCUIT FOR BRUSHLESS MOTOR

BACKGROUND OF THE INVENTION

1. Field of the Invention

This invention relates to a drive circuit for a brushless motor including amplifiers energizing stator windings of the brushless motor through transistors of its output stage in accordance with a position detection signal generated by position detecting means detecting a rotational position of a rotor of the brushless motor, the amplifiers having an amplification degree controlled based on a motor speed control signal.

2. Description of the Prior Art

FIG. 4 shows an above-described type drive circuit for a three-phase brushless motor, for example. Position detecting elements 1a, 1b and 1c are provided for detecting a rotational position of a rotor 3 of the brushless motor. The position detecting elements 1a, 1b, 1c are connected to respective input terminals of a three-phase matrix circuit 2. Three amplifiers 4a, 4b and 4c are provided for supplying drive voltages to stator windings 3a, 3b and 3c of the brushless motor respectively.

Since the above-described amplifiers have the same electrical arrangement, only the amplifier 4a will now be described. The amplifier 4a is composed of a signal amplifying circuit 5a provided in an input stage, an NPN transistor 6a and a PNP transistor 7a both provided in an output stage. An input terminal of the signal amplifying circuit 5a is connected to an output terminal Pa of the three-phase matrix circuit 2. The signal amplifying circuit 5a has a control input terminal Ca to which a speed control signal S is delivered from a control circuit (not shown). The emitters of the transistors 6a, 7a are connected to each other such that the transistors 6a, 7a forms a series circuit. The collector of the transistor 6a is connected to a DC power supply terminal $V_{CC}$ and the collector of the transistor 7a is grounded. The bases of the transistors 6a, 7a are connected in common to an output terminal of the signal amplifying circuit 5a in common.

One terminal side of the stator winding 3a is connected to the emitters of the transistors 6a, 7a in common and the other terminal side of the stator winding 3a is connected to the other terminal sides of the other stator windings 3b, 3c in common.

In accordance with the above-described arrangement, the three-phase matrix circuit 2 delivers, to the amplifiers 4a-4c, voltage signals in accordance with the position detection signals supplied from the position detecting elements 1a-1c respectively. In this case, the delivered voltage signals each have a phase difference and a constant amplitude for the stator windings 3a-3c of each phase respectively. In each of the amplifiers 4a-4c, an amplification factor is varied in accordance with the speed control signal S so that a necessary electric power is supplied to the stator windings 3a-3c.

The transistors 6a-6c and 7a-7c in the output stages of the amplifiers 4a-4c deliver drive voltages $V_a$, $V_b$ and $V_c$ in accordance with base signals supplied to them from the signal amplifying circuits 5a-5c respectively, whereby the brushless motor is driven at a set speed even when the torque applied to the motor varies.

Furthermore, in the above-described prior art arrangement, the drive voltages $V_a$-$V_c$ are supplied to the stator windings 3a-3c by the linear operation of the amplifiers 4a-4c respectively such that rotation of the rotor is accelerated, and moreover, the electric power generated at the stator windings 3a-3c brings about a braking operation. In particular, the above-described arrangement presents fine characteristics when a load with large torque variations is driven and when a load is driven at a low speed with reduced torque ripples induced by the motor.

However, the conventional arrangement described above has the following disadvantage: the transistors 6a-6c and 7a-7c are linearly operated in the respective amplifiers 4a-4c. The transistors 6a-6c and 7a-7c share, as a voltage drop, the voltage obtained by subtracting the delivered drive voltages $V_a$-$V_c$ from the power supply voltage $V_{CC}$. In this case, an electrical loss $W_s$ depends upon the product of the above-mentioned voltage drop and a current $I_m$ flowing in the stator windings 3a-3c in the transistors 6a-6c and 7a-7c. Accordingly, the electrical loss $W_s$ is increased with a large rate of change toward a peak value with increase in the current $I_m$, as shown in FIG. 5. Consequently, in the case where the brushless motor is driven under the condition that its rotational speed is controlled by the amplifiers 4a-4c, the transistors 6a-6c and 7a-7c of the respective amplifiers 4a-4c generate heat when the electrical loss $W_s$ is increased as described above, which prevents an efficient drive control.

SUMMARY OF THE INVENTION

Therefore, an object of the present invention is to provide a drive circuit for the brushless motor wherein the electrical loss in the transistors provided in the output stage is reduced so that the heating of the transistors can be confined and so that the rotational speed of the brushless motor can be efficiently controlled.

The present invention provides a drive circuit for a brushless motor comprising position detecting means for detecting a rotational position of a rotor of the brushless motor, thereby generating position detection signals and a plurality of amplifiers having respective transistors at least in an output stage, the amplifiers feeding an electric power to stator windings of the brushless motor through the transistors of the output stage in a timing in accordance with the position detection signals from the position detecting means respectively, each amplifier having an amplification degree varied based on a speed control signal. A detection resistance provides a voltage drop when an output voltage from each output stage transistor is applied thereto. Reference voltage generating means includes a series circuit of a resistance element connected between a direct current power supply terminal and the detection resistance, a Zener diode which provides a Zener voltage and a buffer amplifier, the reference voltage generating means generating a reference voltage equal to the sum of the voltage drop and the Zener voltage. Power supply adjusting means includes a switching element chopping the output voltage from the direct current power supply terminal to thereby obtain an adjusted voltage. The switching element applies the adjusted voltage to a collector to each output stage transistor, means for generating a pulse width modulation signal for the switching element, controlling an on-off duty ratio of and comparing means for comparing the adjusted voltage applied to each output stage transistor with the reference voltage generated by the reference voltage generating means to thereby control the pulse width modulation signal so that the voltage applied to the collector of each output stage transistor is equalized substantially to the reference voltage.

In accordance with the present invention, the voltages applied to the stator windings of the brushless motor are detected by the voltage detecting means. Based on the detected voltages, the power supply adjusting means controls the voltage applied to each amplifier. Thus, since an unnecessarily high power supply voltage is not applied to each transistor in the output stage of the brushless motor, the voltage shared by the transistors can be confined to a small value with the output voltage delivered to each stator winding maintained at a necessary value. Accordingly, the electrical loss in the transistors of the amplifiers can be confined. Consequently, the heating of each transistor can be restrained to the utmost and the brushless motor can be efficiently controlled.

Other objects of the present invention will become obvious upon understanding of the illustrative embodiment about to be described. Various advantages not referred to herein will occur to those skilled in the art upon employment of the invention in practice.

BRIEF DESCRIPTION OF THE DRAWINGS

An embodiment of the present invention will be described with reference to the accompanying drawings in which.

DESCRIPTION OF THE PREFERRED EMBODIMENT

Figure 1:
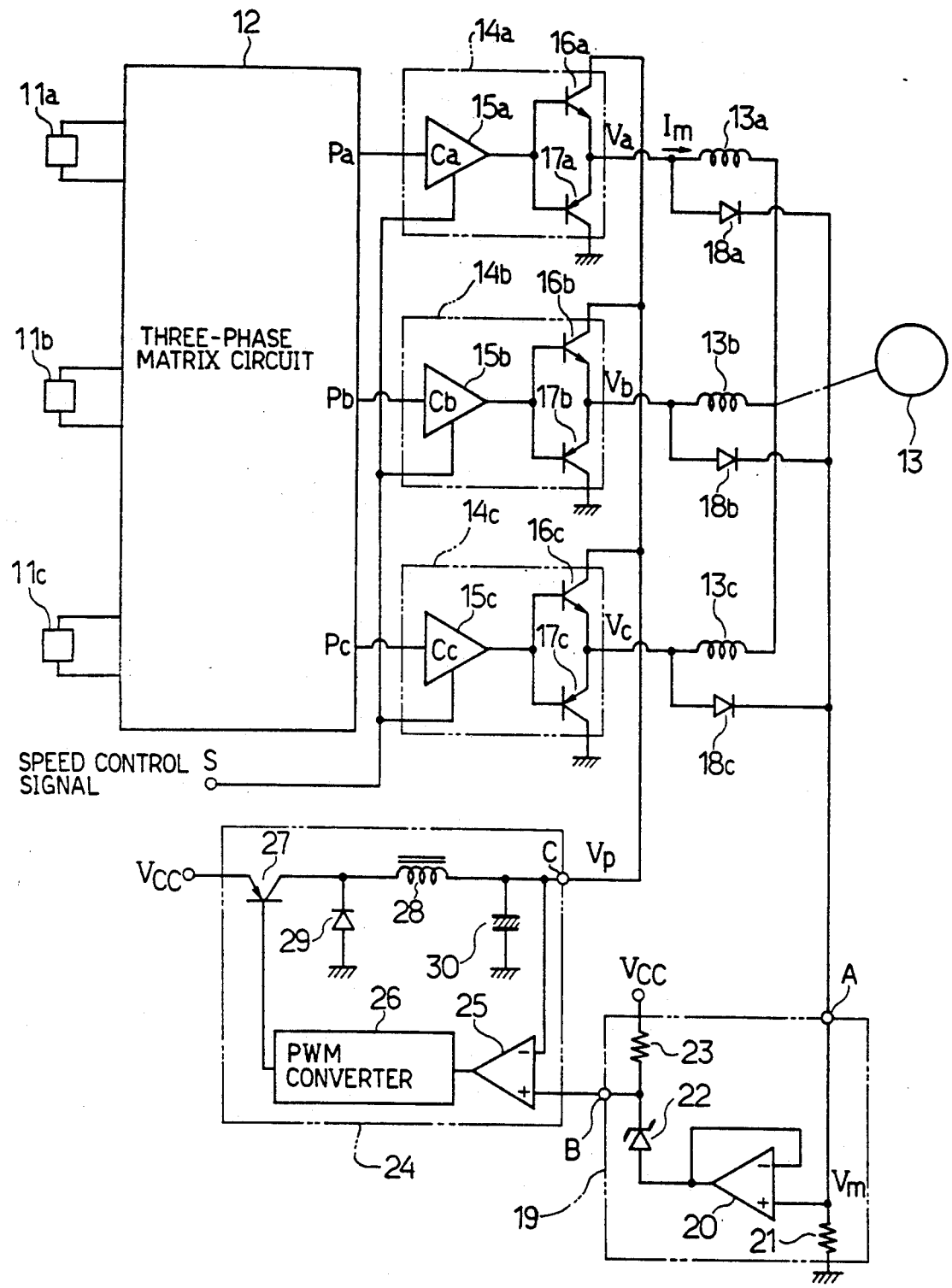
FIG. 1 is a circuit diagram showing an electrical arrangement of the drive circuit for the brushless motor in accordance with an embodiment of the invention.
Figure 2:
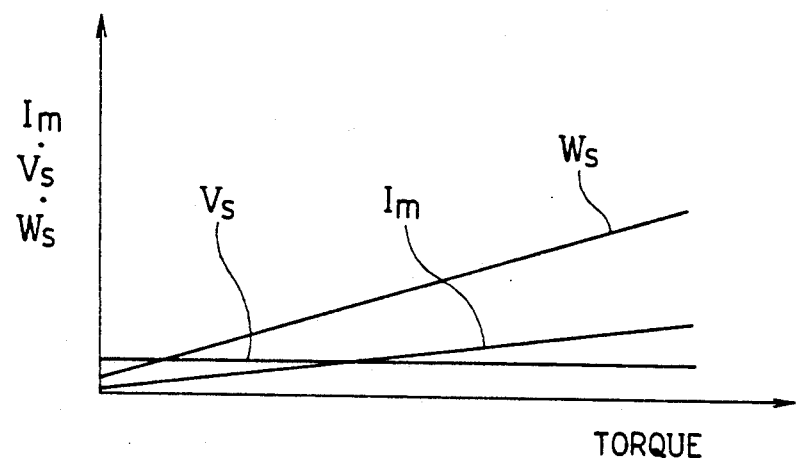
FIG. 2 is a graph showing an electrical loss of the transistors employed in the drive circuit in FIG. 1.
Figure 3:
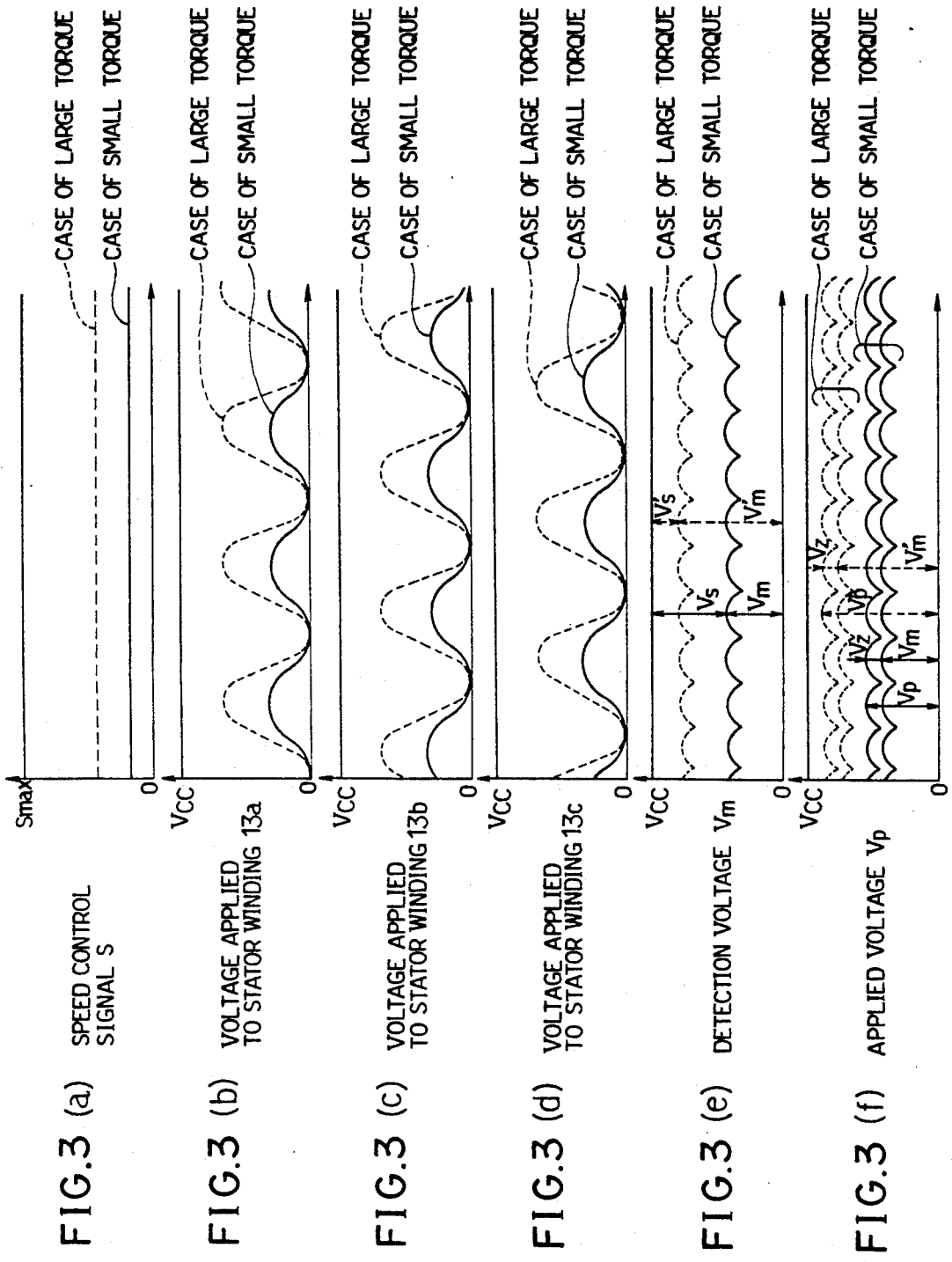
FIGS. 3(a)-3(f) are waveform charts showing the voltage waveforms at respective portions of the drive circuit.
Figure 4:
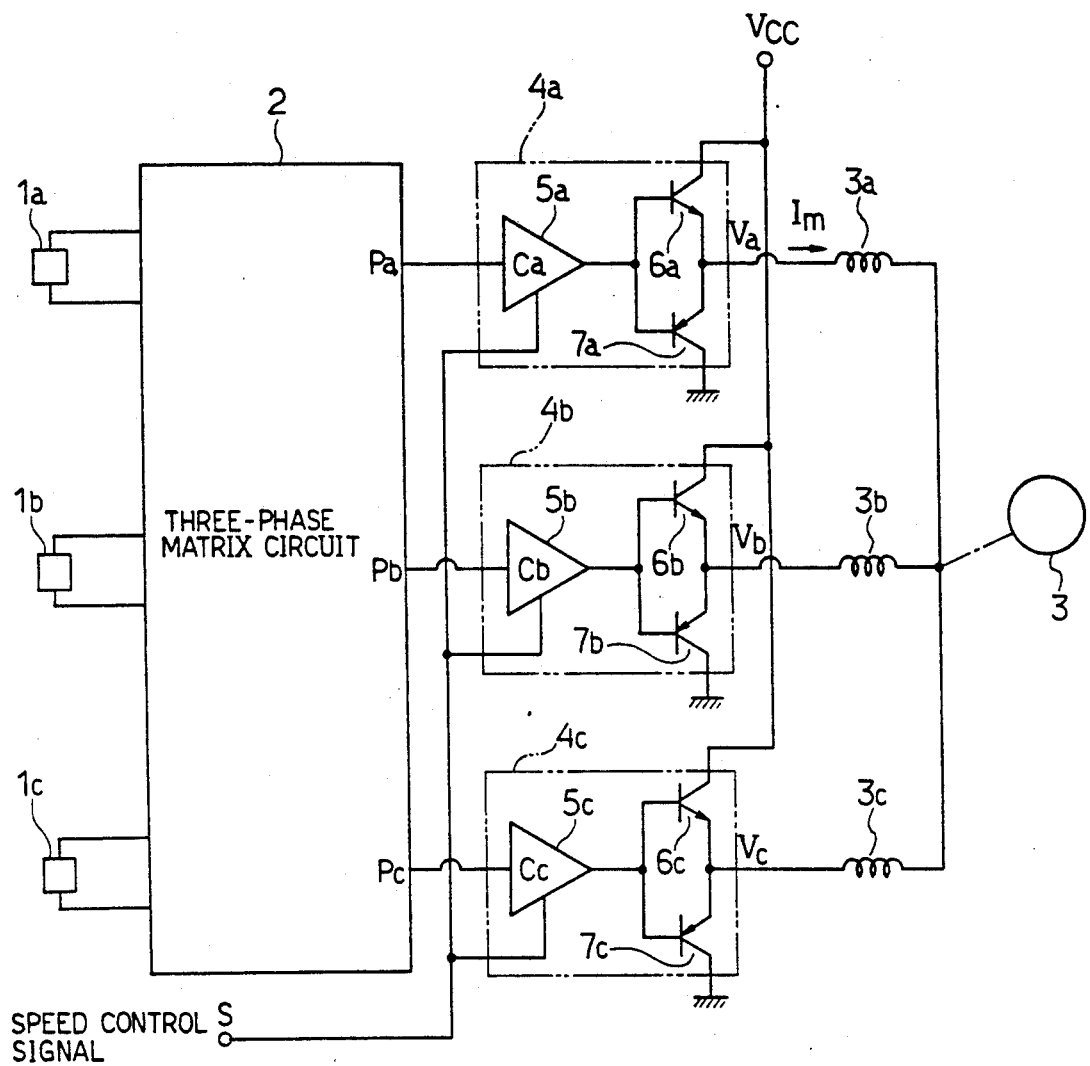
FIG. 4 is a view similar to FIG. 1 showing the prior art.
Figure 5:
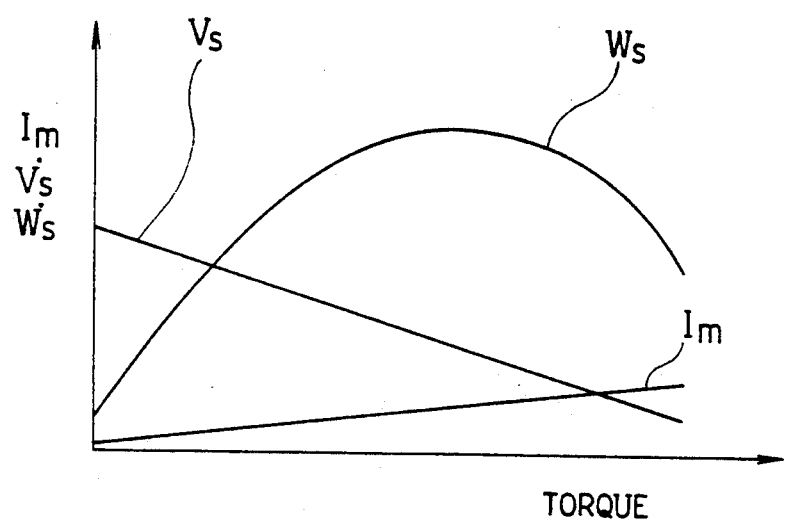
FIG. 5 is a view similar to FIG. 2 showing the prior art.

An embodiment of the present invention will now be described with reference to FIGS. 1 through 3. Referring to FIG. 1, three position detecting elements 11a, 11b and 11c serving as position detecting means are each provided for detecting a rotational position of a rotor 13 of a brushless motor, thereby generating a position detection signal. Output terminals of the position detecting elements 11a-11c are connected to input terminals of a three-phase matrix circuit 12 respectively.

Three amplifiers 14a, 14b and 14c are provided for applying drive voltages to stator windings 13a, 13b and 13c of the brushless motor respectively. Since the amplifiers 14a-14c have the same electrical arrangement, only the amplifier 14a will now be described. The amplifier 14a is composed of a signal amplifying circuit 15a provided in an input stage, an NPN transistor 16a and a PNP transistor 17a both provided in an output stage to serve as buffers. An input terminal of the signal amplifying circuit 15a is connected to an output terminal Pa of the three-phase matrix circuit 12. The signal amplifying circuit 15a has a control input terminal Ca to which a speed control signal S is delivered from a control circuit (not shown). In this regard, the control circuit is supplied with a speed command value from a speed setter (not shown) and a speed detection signal from a speed detector (not shown). The control circuit obtains a deviation between the speed command value and the speed detection signal, thereby generating a torque command value or voltage signal as the speed control signal S. The emitters of the transistors 16a, 17a are connected to each other such that the transistors 16a, 17a forms a series circuit. The bases of the transistors 16a, 17a are connected in common to an output terminal of the signal amplifying circuit 15a. The collector of the transistor 17a is grounded.

One terminals of the stator windings 13a-13c are connected to the emitters of the transistors 16a-16c respectively. The other terminals of the stator windings 13a-13c are connected to an input terminal A of a voltage detecting circuit 19 serving as voltage detecting means through diodes 18a, 18b and 18c each having the polarity shown in FIG. 1, respectively.

The input terminal A of the voltage detecting circuit 19 is connected to a non-inverting input terminal (+) of an operational amplifier 20 serving as a buffer amplifier and is grounded via a resistance 21. An output terminal of the operational amplifier 20 is connected to an output terminal B of the voltage detecting circuit 19 via a forward connected Zener diode 22 and further connected to a DC power supply terminal $V_{CC}$ via a resistance 23. An inverting input terminal (−) of the operational amplifier 20 is connected to its output terminal.

The arrangement of a switching power supply circuit 24 serving as voltage adjusting means will now be described. A non-inverting input terminal (+) of an operational amplifier or a comparator 25 is connected to the output terminal B of the voltage detecting circuit 19. An output terminal of the comparator 25 is connected to the base of a switching PNP transistor 27 serving as a switching element via a PWM converter 26 which delivers a PWM control signal to the base of the transistor 27 in accordance with an output signal from the comparator 25. The emitter of the transistor 27 is connected to a DC power supply terminal $V_{CC}$ and its collector is connected to an inverting input terminal (−) of the comparator through a reactor 28 and an output terminal C. The collector of the transistor 27 is further grounded via a diode 29 having the polarity shown in FIG. 1. The output terminal C is grounded via a smoothing capacitor 30. The output terminal C of the switching power supply circuit 24 is connected to the collectors of the transistors 16a-16c of the respective amplifiers 14a-14c.

The operation of the above arrangement will be described. The position detecting elements 11a-11c supply the three-phase matrix circuit 12 with the position detection signal in accordance with the rotational state of the rotor 13. According to the position detection signal, the three-phase matrix circuit 12 delivers to the amplifiers 14a-14c voltage signals having the phase difference and the amplitude for energizing the stator windings 13a-13c corresponding to the respective phases.

In the amplifiers 14a-14c, the respective signal amplifying circuits 15a-15c amplify the signals from the three-phase matrix circuit 12 in the amplification degree set by the speed control signal S or torque command value (see FIG. 3(a)), thereby generating amplified signals. These amplified signals are further amplified by the respective transistors 16a-16c and 17a-17c at the output stage so that sinusoidal output voltages or drive voltages $V_a$–$V_c$ (see FIGS. 3(b), 3(c) and 3(d)) are obtained. The obtained drive voltages $V_a$–$V_c$ are supplied to the respective stator windings 13a-13c.

The above-mentioned drive voltages $V_a$–$V_c$ are composed into a voltage via the respective diodes 18a–18c, which voltage is detected as a detection voltage $V_m$ (see FIG. 3(e)) by the voltage detecting circuit 19. More specifically, the drive voltages $V_a$–$V_c$ are commonly supplied to the input terminal A of the voltage detecting circuit 19, and the detection voltage $V_m$ takes the waveforms as shown in FIG. 3(e). This voltage $V_m$ appears as a voltage drop across both ends of the resistance 21. For example, the detection voltage $V_m$ takes the waveform shown by solid line when the torque is small and the drive voltages $V_a$–$V_c$ are small. When the torque is increased, the detection voltage $V_m'$ takes the waveform as shown by broken line.

The voltage detecting circuit 19 develops at its output terminal B the voltage $V_O$ obtained as a reference voltage by adding to the detection voltage $V_m$ a constant voltage or Zener voltage $V_z$ from the Zener diode 22. In this regard, the Zener voltage $V_z$ is so set as to take a value slightly, larger than the collector saturation voltages $V_O$ of the output stage transistors 16a–16c and 17a–17c of the respective amplifiers 14a–14c. An output voltage from the output terminal B of the voltage detecting circuit 19 is a power supply voltage actually necessary for the output stage transistors of the respective amplifiers 14a–14c.

The switching power supply circuit 24 compares the collector supply voltage $V_p$ currently delivered from the output terminal C with the reference voltage $V_O$ from the terminal B of the voltage detecting circuit 19. An on-off duty ratio of the switching signal is determined by the PWM converter 26 in accordance with the difference between the power supply voltage $V_p$ and the voltage $V_O$ from the circuit 19, whereby the transistor 27 is on-off controlled. Consequently, the DC power supply voltage $V_{CC}$ is chopped by the transistor 27 and smoothed by the reactor 28 and the capacitor 30 so as to be equal to the applied voltage $V_p$ which is the sum $V_O$ of the detection voltage $V_m$ from the voltage detecting circuit 19 and the Zener voltage $V_z$.

Thus, the output stage transistors 16a–16c and 17a–17c of the respective amplifiers 14a–14c are usually supplied with the applied voltage $V_p$ which is the sum $V_O$ of the detection voltage $V_m$ and the Zener voltage $V_z$. In this state, the Zener voltage $V_z$ slightly larger than the collector saturation voltages is only applied to the transistors 16a–16c and 17a–17c when the drive voltages to be delivered takes the peak values. Thus, the voltage shared by a pair of transistors take an approximately necessary minimum value which is the sum of the collector saturation voltage and a slight voltage though the voltage operatively belongs to an active domain. Consequently, as shown in FIG. 2, the voltage drop $V_s$ at the peak values of the drive voltages $V_a$–$V_c$ of the respective output stage transistors 16a–16c and 17a–17c takes an approximately constant value irrespective of the magnitude of the torque and shows the characteristic that only the current $I_m$ is increased in proportion to the torque. Accordingly, the collector loss $W_s$ obtained as the product of these values is proportional to the torque and is reduced to the utmost as compared with the prior art.

In accordance with the above-described embodiment, the drive voltages $V_a$–$V_c$ or the output voltages of the amplifiers 14a–14c are detected by the voltage detecting circuit 19. The applied voltage $V_p$ is obtained by the switching power supply circuit 24 by adding the constant voltage or the Zener voltage $V_z$ to the detection voltage $V_m$ or $V_m'$. The applied voltage $V_p$ is supplied to the amplifiers 14a–14c. Accordingly, unnecessarily high voltage is not shared by the output stage transistors 16a–16c and 17a–17c of the respective amplifiers 14a–14c and the loss $W_s$ in these transistors can be reduced, whereby the rise in the temperatures of the transistors 16a–16c and 17a–17c can be restrained and the drive control of the brushless motor can be efficiently performed.

The foregoing disclosure and drawings are merely illustrative of the principles of the present invention and are not to be interpreted in a limiting sense. The only limitation is to be determined from the scope of the appended claims.

We claim:

1. A drive circuit for a brushless motor comprising:
   a) position detecting means for detecting a rotational position of a rotor of the brushless motor, thereby generating position detection signals;
   b) a plurality of amplifier having respective transistors at least in respective output stages, the amplifiers feeding electric power to respective stator windings of the brushless motor through the respective transistors of the output stages timed in accordance with the position detection signals from the position detecting means respectively, each amplifier having a degree of amplification varied based on a speed control signal;
   c) a detection resistance obtaining a voltage drop ($V_m$) when an output voltage from each output stage transistor is applied thereto;
   d) reference voltage generating means including a series circuit of a resistance element connected between a direct current power supply terminal and the detection resistance, a Zener diode providing a Zener voltage ($V_z$) and a buffer amplifier, the reference voltage generating means generating a reference voltage equal to the sum of the voltage drop ($V_m$) and the Zener voltage ($V_z$); and
   e) power supply adjusting means including a switching element which chops the output voltage from the direct current power supply terminal to thereby obtain an adjusted voltage ($V_p$), the switching element applying the adjusted voltage ($V_p$) to a collector of each output stage transistor, means for generating a pulse width modulation signal for controlling an on-off duty ratio of the switching element, and comparing means for comparing the adjusted voltage ($V_p$) applied to each output stage transistor with the reference voltage generated by the reference voltage generating means to thereby control the pulse width modulation signal so that the voltage ($V_p$) applied to the collector of each output stage transistor is substantially equal to the reference voltage.

2. A drive circuit for a brushless motor comprising:
   a) position detecting means for detecting a rotational position of a rotor of the brushless motor, thereby generating position detection signals;
   b) a plurality of amplifier having respective transistors at least in respective output stages, the amplifier feeding electric power to respective stator winding of the brushless motor through the respective transistors of the output stages timed in accordance with the position detection signals from the position detecting means respectively, each amplifier having a degree of amplification based on a speed control signal;

c) a first resistance having one end connected to the emitter of each output stage transistor through a diode forward biased with respect to an emitter current, and the other end connected to a ground terminal;

d) a Zener diode connected at one of two ends to a direct current power supply terminal via a second resistance and at the other end to a node of the diodes and the first resistances via a buffer amplifier;

e) a switching transistor connected between the collectors of the output stage transistors and the direct current power supply terminal;

f) pulse width modulation signal generating means for generating a pulse width modulation signal supplied to the base of each output stage transistor; and g) a comparing operational amplifier having one of two input terminals connected to a node of the Zener diode and the second resistance and the other input terminal connected to the collector of each output stage transistor, the comparing operational amplifier generating a control signal in accordance with a voltage difference between the input terminals thereof, the control signal generated by the comparing operational amplifier being supplied to the pulse width modulation signal generating means so that a duty ratio of the pulse width modulation signal is controlled, whereby a voltage ($V_p$) applied to the collector of each output stage transistor takes a value which is substantially the same as the addition of a terminal voltage ($V_m$) of the first resistance and the Zener voltage of the Zener diode.

* * * * *